United States Patent Office 3,541,298
Patented Nov. 17, 1970

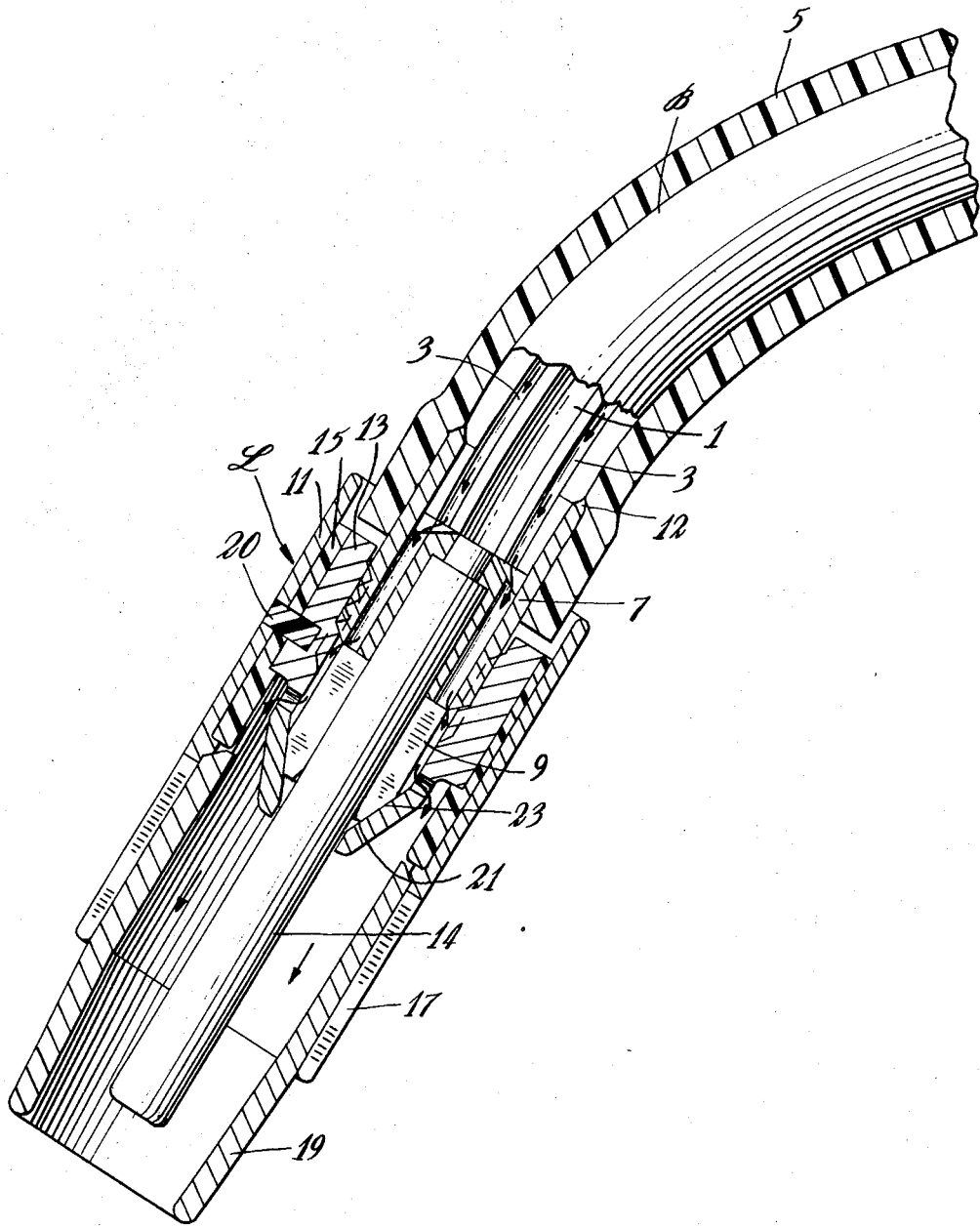

3,541,298
METAL-INERT-GAS WELDING TORCH
Donald Wesley Carkhuff, Jamesburg, N.J., assignor to Union Carbide Corporation, New York, N.Y., a corporation of New York
Filed Sept. 12, 1968, Ser. No. 759,330
Int. Cl. B23k 9/00
U.S. Cl. 219—130         3 Claims

ABSTRACT OF THE DISCLOSURE

A front end assembly for electric arc welding torches featuring a threadless contact tube held in a resilient member which is tightened about the contact tube by a locking-assembly. A threadless nozzle is replaceably held by the locking-assembly. The nozzle can be replaced by pulling-off the old nozzle and pushing-in a new nozzle.

---

This invention relates to an electric arc welding torch. More particularly the invention relates to a consumable electrode metal arc gas shielded welding torch.

As is well known in the art of metal inert gas welding (Mig), a consumable electrode wire from which an arc is established is fed from a source thereof through a welding torch to a point of use. Welding current is usually introduced into the wire through a contact tube mounted in the torch. Frequently the contact tube becomes damaged due to, for example, burnback of the wire into the contact tube or from excessive welding spatter. In such a case the contact tube must be replaced. Up until now it was necessary to remove the torch nozzle to get at the contact tube and then the contact tube had to be threadably removed from the torch body.

In most cases, especially when larger diameter wires are being used, a special tool is required to turn the threaded contact tube against the force of the wire thus making it difficult to unthread the contact tube from the torch body. This adds time and cost to the welding operation and, of course, aggravates the welding operator.

Accordingly, it is an object of this invention to provide a novel front end assembly for Mig torches whereby damaged contact tubes can be removed without removing the nozzle.

Another object is to provide a front end assembly for Mig torches whereby a threadless contact tube can be inserted into the torch from outside the nozzle and can be held therein only by tightening a collet-locking assembly.

It is another object to provide such a torch which has the additional feature of a push-in-pull-off nozzle.

These and other objects will be pointed out or become apparent from the following description and drawings wherein the sole figure is a front elevation partially in cross-section of a front end assembly exemplifying the invention.

The objects of the invention are accomplished in a general way by a torch body which carries a resilient member at the front end thereof. The resilient member accepts a threadless contact tube adapted to be fitted into the resilient member. A locking-assembly means having a means for distributing shielding gas from the torch body is provided for tightening the resilient member thereby securing the threadless contact tube in the resilient member.

More specifically, the objects of the invention are accomplished by a torch body which carries a spidered collet at the front end thereof. A collet-locking assembly is threadably fastened to the collet. A nozzle is fitted into the forward end of the collet-locking assembly and is resiliently held therein. The spidered collet accepts a threadless contact tube which may be inserted into the spidered collet from outside the nozzle and collet-locking assembly. The contact tube is held in place only by threading the collet-locking assembly on the collet thereby closing the spidered portion of the collet around the threadless contact tube.

Referring now to the drawing, the torch body is shown generally at B. Torch body B is provided with a wire passage 1 and gas passages 3. Alternatively wire and gas may be introduced into the torch body through the same passage. In some torches it is even preferred that the gas and wire be supplied through the same passage. Surrounding torch body B is an insulating sheath 5 usually rubber. A collet 7 having a plurality of sections 9 forming a spidered portion is soldered to the torch body B at points 12, for example. The spidered collet 7 forms a resilient member into which threadless contact tube 14 may be inserted. A locking assembly shown generally at L, having an outer shell 11; an insulating member 15 usually a material such as a silicone compound is provided inside said outer shell 11; and a collet body 13 contiguous to said insulating member 15 is threadably fastened to the collet 7 by a threaded section on the collet body 13 mating with a threaded section on collet 7. Locking-assembly L is an integrated piece. In the drawing the parts 11, 15 and 13 are securely held by a pin 20 made of insulating material. However, the locking assembly L may be made by injection molding. The outer shell 11 is usually manufactured from stainless steel or any heat treatable steel. The outer shell 11 has a plurality of section 17 which resiliently grips a nozzle 19 so that the nozzle may be pushed-in or pulled-out of said outer shell without the need for any threaded sections or separate clamping means. The nozzle may be made of any sutiable nozzle material such as copper or ceramic but preferably the nozzle is made of anodized aluminum. The anodized aluminum provides for electrical insulation of the nozzle from the contact tube when excessive spatter builds up inside the nozzle.

In operation when the need arises to replace the contact tube 14, the operator turns the collet-locking assembly 11 which unthreads the collet body 13 from the collet 7. Tapered surface 21 of collet body 13 releases the mating tapered surface 23 of spidered portion 9 thus freeing the contact tube 14 which either falls out or may be inched out by inch-feeding the welding wire through the torch. A new contact tube is then inserted into the collet 7 from outside the nozzle 19 and the collet-locking assembly L is threaded onto collet 7 thus bringing the mating surfaces 21 and 23 together and tightening spidered section 9 around the contact tube 14.

If for any reason it becomes necessary to remove the nozzle 19, merely pulling the nozzle out will release it from the portion 17 of outer shell 11. A new nozzle is simply snapped into the outer shell 11.

It is obvious from the above description that the nozzle front end arrangement of this invention provides for a simple, quick way of replacing contact tubes and nozzles without the necessity of separate tools or clamping means.

Having described the invention with reference to certain preferred embodiments, it should be understood that modification may be made to certain parts and to the arrangement of such parts without departing from the spirit and scope of the invention.

What is claimed is:
1. A consumable electrode metal arc welding torch comprising:
   a torch body;
   a spidered collet carried by the front end of said torch body;
   a collet-locking assembly threadably fastened to said collet;

a nozzle fitted into the forward end of said collet-locking assembly and resiliently held therein;
a threadless contact tube adapted to be fitted into said spidered collet from the outside of said nozzle and collet-locking assembly, said contact tube being held in place only by threading said collet-locking assembly on said collet.

2. A consumable electrode metal arch welding torch comprising:
a torch body;
a spidered collet carried by the front end of said torch body:
a collet-locking assembly threadably fastened to said collet and comprising an outer shell having provided therein an insulating member and a collet body contiguous to said insulating member;
a nozzle fitted into the forward end of said outer shell of said collect-locking assembly and resiliently held therein;
a threadless contact tube adapted to be fitted into said spidered collet from the outside of said nozzle and collet-locking assembly, said contact tube being fastened in place only by threading said collet-locking assembly on said collet.

3. Apparatus according to claim 2 wherein said spidered collet and collet body are provided with mating tapered surfaces.

References Cited
UNITED STATES PATENTS

| | | | |
|---|---|---|---|
| 2,754,395 | 7/1956 | Scheller et al. | 219—130 |
| 3,112,392 | 11/1963 | Orr et al. | 219—130 |
| 3,121,784 | 2/1964 | McGinty et al. | 219—130 X |
| 3,230,342 | 1/1966 | Meyer | 219—130 |
| 3,265,856 | 8/1966 | Cecil | 219—130 |

JOSEPH V. TRUHE, Primary Examiner

G. A. MONTANYE, Assistant Examiner